(12) United States Patent
Ha et al.

(10) Patent No.: US 12,359,291 B2
(45) Date of Patent: Jul. 15, 2025

(54) HIGH-STRENGTH GALVANIZED STEEL SHEET HAVING EXCELLENT DISTINCTNESS OF IMAGE AFTER PAINTING AND MANUFACTURING METHOD THEREFOR

(71) Applicant: POSCO CO., LTD, Pohang-si (KR)

(72) Inventors: Yu-Mi Ha, Gwangyang-si (KR);
Jun-Sung Yeom, Gwangyang-si (KR);
Seong-Ho Han, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/034,056

(22) PCT Filed: Oct. 27, 2021

(86) PCT No.: PCT/KR2021/015226
§ 371 (c)(1),
(2) Date: Apr. 26, 2023

(87) PCT Pub. No.: WO2022/097989
PCT Pub. Date: May 12, 2022

(65) Prior Publication Data
US 2023/0399726 A1  Dec. 14, 2023

(30) Foreign Application Priority Data
Nov. 5, 2020  (KR) .................. 10-2020-0147015

(51) Int. Cl.
| | | |
|---|---|---|
| C22C 38/00 | (2006.01) |
| C21D 8/02 | (2006.01) |
| C22C 38/02 | (2006.01) |
| C22C 38/04 | (2006.01) |
| C22C 38/06 | (2006.01) |
| C22C 38/12 | (2006.01) |
| C22C 38/14 | (2006.01) |
| C23C 2/06 | (2006.01) |

(52) U.S. Cl.
CPC .......... *C22C 38/004* (2013.01); *C21D 8/0221* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C23C 2/06* (2013.01); *C21D 2211/005* (2013.01)

(58) Field of Classification Search
None
See application file for complete search history.

(56) References Cited

U.S. PATENT DOCUMENTS

| | | | | |
|---|---|---|---|---|
| 5,200,005 A * | 4/1993 | Najah-Zadeh | ....... | C21D 8/0231 148/648 |
| 2014/0021382 A1 | 1/2014 | Jurena et al. | | |
| 2015/0203948 A1 | 7/2015 | Sugiura et al. | | |
| 2015/0209848 A1 | 7/2015 | Kopplin et al. | | |
| 2018/0371569 A1 | 12/2018 | Kwak et al. | | |
| 2020/0040424 A1* | 2/2020 | Aarnts | ....... | C23C 2/20 |
| 2020/0056255 A1* | 2/2020 | Stögmüller | ....... | C22C 38/06 |
| 2020/0056258 A1* | 2/2020 | Hebesberger | ....... | C21D 6/008 |
| 2020/0087761 A1 | 3/2020 | Aarnts et al. | | |
| 2020/0332379 A1 | 10/2020 | Friedel et al. | | |

FOREIGN PATENT DOCUMENTS

| | | |
|---|---|---|
| CN | 108431268 A | 8/2018 |
| CN | 109097689 A | 12/2018 |
| EP | 1291448 | 6/2006 |
| JP | 2001131694 A | 5/2001 |
| JP | 2001303180 | 10/2001 |
| JP | 2001303180 A * | 10/2001 |
| JP | 2001335887 A | 12/2001 |
| JP | 2002206138 A | 7/2002 |
| JP | 2003138347 A | 5/2003 |
| JP | 2003286556 A | 10/2003 |
| JP | 2006016630 | 1/2006 |
| JP | 2006097102 A | 4/2006 |
| JP | 2008169427 | 7/2008 |
| JP | 6334536 B2 | 5/2018 |
| JP | 2019534949 | 12/2019 |
| JP | 7066698 B2 | 5/2022 |
| KR | 20020019124 | 3/2002 |

(Continued)

OTHER PUBLICATIONS

International Search Report—PCT/KR2021/015226 dated Feb. 9, 2022.
Japanese Office Action—Japanese Application No. 2023-526083 issued on May 21, 2024.
Chinese Office Action—Chinese Application No. 202180075043.4 issued on Dec. 5, 2024.
Japanese Decision of Rejection—Japanese Application No. 2023-526083 issued on Nov. 19, 2024.

*Primary Examiner* — Seth Dumbris
(74) *Attorney, Agent, or Firm* — CANTOR COLBURN LLP

(57) ABSTRACT

Provided are a high-strength galvanized steel sheet having excellent distinctness of image after painting and a manufacturing method therefor. The steel sheet includes: by mass %, 0.003 to 0.005% of C, 0.05% or less of Si, 0.4 to 1.0% of Mn, 0.04 to 0.06% of P, 0.01% or less of S, 0.005% or less of N, 0.1% or less of S. Al, 0.05 to 0.08% of Mo, 0.005 to 0.03% of Ti, 0.02 to 0.035% of Nb, 0.06 to 0.1% of Cu, 0.0015% or less of B, and a balance of Fe and inevitable impurities. The alloy microstructure has ferrite in an amount of 95% by area fraction or greater, and the ferrite has a grain average size of 15 μm or less, with the ultra-fine grain 5 μm or less having an occupancy ratio to 7 to 10% within 1 mm×1 mm area.

2 Claims, No Drawings

(56) References Cited

FOREIGN PATENT DOCUMENTS

| | | |
|---|---|---|
| KR | 20100001334 | 1/2010 |
| KR | 20100025923 | 3/2010 |
| KR | 20150072806 | 6/2015 |

* cited by examiner

HIGH-STRENGTH GALVANIZED STEEL SHEET HAVING EXCELLENT DISTINCTNESS OF IMAGE AFTER PAINTING AND MANUFACTURING METHOD THEREFOR

TECHNICAL FIELD

The present disclosure relates to a high-strength ultra-low carbon steel coated steel sheet having excellent distinctness of image after painting and reducing a weight of a vehicle and a manufacturing method therefor, and more particularly, to a high-strength galvanized coated steel sheet that may be preferably applied as an external plate material of a vehicle and a manufacturing method therefor.

BACKGROUND ART

Manufacturers apply strict requirements to painted steel components for exterior panels of vehicles, such as a hood and a door. One of these requirements relates to painted appearances of painted components. When exterior panels that have a very good painted appearance, that is, panels have a mirror-like surface reflecting light without distortion to produce sharp reflective images, the exterior panels are highly appreciated. The painted appearance is influenced by the surface of the (coated) substrate as well as the quality of the paint. This surface includes in-plane structures of various sizes and scales. Smaller structures are identified by surface roughness, while larger structures are identified by so-called surface waviness.

It is already known to those skilled in the art that larger surface structures, for example, surface waviness are conducted through different paint layers. Therefore, the surface waviness of the (coated) substrate still exists to some extent on a surface of an outer painted layer. In addition, since automobile manufacturers are seeking to save energy and reduce costs through an undercoat omission during a painting process, surface waviness of a vehicle is becoming more and more important. It is important to recognize that the surface waviness needs to be measured after pressing or forming has been applied.

It is known to a person skilled in the art that the surface waviness of the formed part is a result of the surface waviness of an undeformed part, for example, a flat part, and the increase in the surface waviness introduced by the forming step. The difference between the formed partial waviness and the undeformed partial waviness is referred to as delta waviness, for example, $\Delta Wsa$.

RELATED ART DOCUMENT (Patent Document 1) Korean Patent Application No. 2013-0160369

DISCLOSURE

Technical Problem

The present disclosure may provide a high-strength hot-dip galvanized steel sheet having excellent distinctness of image after painting by adding P, Nb, and Ti to ultra-low carbon steel applied to an external plate of a vehicle requiring formability to control grain size distribution, and a manufacturing method therefor.

An object of the present invention is not limited to the above-described contents. The problems of the present invention will be understood from the overall content of this specification, and those of ordinary skill in the art to which the present invention pertains will have no difficulty in understanding additional problems of the present invention.

Technical Solution

According to an aspect in the present disclosure, a high-strength hot-dip galvanized steel sheet having excellent surface distinctness of image after painting may include: by mass %, 0.003 to 0.005% of C, 0.05% or less of Si, 0.4 to 1.0% of Mn, 0.04 to 0.06% of P, 0.01% or less of S, 0.005% or less of N, 0.1% or less of S. Al, 0.05 to 0.08% of Mo, 0.005 to 0.03% of Ti, 0.02 to 0.035% of Nb, 0.06 to 0.1% of Cu, 0.0015% or less of B, and a balance of Fe and inevitable impurities, in which C, Ti, and Nb satisfy Relationship Formula 1, an alloy microstructure has ferrite in an amount greater than 95% by area fraction, the ferrite has a grain average size of 15 μm or less, an ultra-fine grain of 5 μm or less has an occupancy ratio to 7 to 10% within a 1 mm×1 mm area, and $\Delta Wsa$ is 0.1 or less as defined by Relationship Formula 2.

$$0.03 \leq [(Nb(48/93)) + (Ti(93/48)) + (C(12/48))] \leq 0.04 \quad \text{[Relationship Formula 1]}$$

$\Delta Wsa$=surface waviness of steel sheet after 5% deformation−surface waviness of steel sheet before deformation. [Relationship Formula 2]

The hot-dip galvanized steel sheet may have a tensile strength of 390 to 430 MPa and an elongation of 32% or more.

Another aspect of the present disclosure, a method of manufacturing a high-strength hot-dip galvanized steel sheet having excellent surface distinctness of image after painting may include:

heating a steel slab satisfying a composition component at 1100 to 1300° C.;

manufacturing a hot-rolled steel sheet by hot-rolling the heated steel slab to a finish-rolling temperature of 920 to 970° C., and then coiling the heated steel slab at a temperature of 600 to 650° C.;

manufacturing a cold-rolled steel sheet by cold-rolling the coiled hot-rolled steel sheet at a reduction ratio of 70 to 83% after pickling the coiled hot-rolled steel sheet;

annealing the cold-rolled steel sheet within a temperature range of 760 to 830° C. and then performing hot-dip galvanizing on the cold-rolled steel sheet; and performing alloying heat treatment on the hot-dip galvanized steel sheet within a temperature range of 500 to 560° C.

0.6 to 1.2% skin pass rolling may be performed using a skin pass roll having a roughness Ra of 1.0 to 1.6 μm for the alloyed hot-dip galvanized steel sheet subjected to the alloying heat treatment.

Advantageous Effects

As set forth above, since the hot-dip galvanized coated steel sheet of the present disclosure having the configuration described above has excellent distinctness of image after painting and high strength, the hot-dip galvanized coated steel sheet may be stably used as a steel sheet for an exterior panel of a vehicle. Therefore, it becomes possible to expand an application range of a high-strength cold-rolled steel sheet containing P to a vehicle body, which has not been applied so far, for example, to an exterior surface, or the like, and as a result, it is possible to further reduce a weight of a vehicle body.

BEST MODE

Hereinafter, the present disclosure will be described below.

As a result of in-depth research to solve the problems of the related art described above, the inventors of the present disclosure have come to complete the present disclosure by confirming that a high-formability high-strength steel sheet for an external plate of a vehicle having a tensile strength of 390 MPa or more and excellent surface quality by adding P, Mo, and the like while securing formability by adding titanium (Ti) and/or niobium (Nb), and the like, which are strong carbonitride forming elements in steel, to minimize solid-solution elements such as carbon (C), nitrogen (N), and sulfur (S) may be manufactured. In general, a steel sheet for an external plate of a vehicle should satisfy press formability such as deep drawability as well as high tensile strength. Therefore, as a base material of the alloyed hot-dip galvanized steel sheet of the present disclosure, in order to improve processability, a high-strength steel sheet that uses ultra-low carbon steel as a basic component and is added with reinforcing elements such as Mn and P was used.

Therefore, from this viewpoint, a high strength hot-dip galvanized steel sheet having surface distinctness of image after painting of the present disclosure includes: by mass %, 0.003 to 0.005% of C, 0.05% or less of Si, 0.4 to 1.0% of Mn, 0.04 to 0.06% of P, 0.01% or less of S, 0.005% or less of N, 0.1% or less of S. Al, 0.05 to 0.08% of Mo, 0.005 to 0.03% of Ti, 0.02 to 0.035% of Nb, 0.06 to 0.1% of Cu, 0.0015% or less of B, and a balance of Fe and inevitable impurities, in which C, Ti, and Nb satisfy Relationship Formula 1. The alloy microstructure has ferrite in an amount greater than 95% by area fraction, and the ferrite has a grain average size of 15 μm or less, with the ultra-fine grain 5 μm or less having an occupancy ratio to 7 to 10% within a 1 mm×1 mm area. ΔWsa is 0.1 or less as defined by Relationship Formula 2.

First, the alloy components of the cold-rolled steel sheet constituting the base of the hot-dip galvanized coated steel sheet of the present disclosure and the reason for limiting the content thereof will be described. Meanwhile, here, "%" means "wt %" unless otherwise specified.

Carbon (C): 0.003 to 0.005%

C is an interstitial solid element, has a great effect on the formation of a texture of a steel sheet during cold rolling and annealing, and requires addition of at least 0.003% or more for this purpose. However, when the amount of carbon solid-solved in steel increases, the growth of grains with {111} gamma (γ)-fiber textures, which is advantageous for drawing processing, is suppressed, and the growth of grains with {110} and {100} textures is promoted, so the drawability of the annealing plate deteriorates. Furthermore, when the content of C exceeds 0.005%, the content of Ti and Nb required to precipitate Ti and Nb as carbides increases, which is disadvantageous in terms of economic efficiency, and pearlite and the like may be generated to reduce formability. Therefore, in the present disclosure, the content of C is preferably limited to the range of 0.003 to 0.005%.

Silicon (Si): 0.05% or Less (Excluding 0%)

Si is an element that contributes to an increase in strength by solid solution strengthening. When the content of Si exceeds 0.05%, surface scale defects are caused to deteriorate plating surface properties, so in the present disclosure, the content of Si is preferably managed to 0.05% or less.

Manganese (Mn): 0.4 to 1.0%

Mn is a solid-solution reinforcing element, and not only contributes to increase in strength but also serves to precipitate S in steel as MnS. When the content of Mn is less than 0.4%, there is a concern about strength degradation, whereas when the content of Mn exceeds 1.0%, surface problems due to oxides may occur, so the content of Mn is preferably limited to 0.4 to 1.0%.

Phosphorus (P): 0.04 to 0.06%

P is the most effective element for ensuring the strength of the steel without significantly impairing the drawability and having the most excellent solid-solution effect. When the content of P is less than 0.04%, it is impossible to secure desired strength, whereas when the content of P exceeds 0.06%, since secondary embrittlement and surface streak defects due to P segregation may occur, it is preferable to limit the content of P to the range of 0.04 to 0.06%.

Molybdenum (Mo): 0.05 to 0.08%

Mo is an element having a high affinity for P (phosphorus) and serves to suppress P segregation. In order to secure the high strength in the ultra-low carbon steel, P needs to be inevitably added, and Mo may be added in an appropriate amount to partially contribute to improving surface defects caused by P segregation. When the content of Mo is less than 0.05%, the desired surface improvement is not significantly effective, and when the content of Mo exceeds 0.08%, the price is expensive and cost competitiveness is lowered, so the content of Mo is preferably limited to the range of 0.05 to 0.08%.

Sulfur (S): 0.01% or less, Nitrogen (N): 0.005% or less

S and N are unavoidably added as impurities present in steel, and it is preferable to control the content of S and N as low as possible in order to secure excellent welding characteristics. In the present disclosure, the content of S is controlled to 0.01% or less, and the content of N is preferably managed to 0.005% or less.

Aluminum (Al): 0.1% or Less (Excluding 0%)

Al contributes to improving the drawability and ductility of steel by precipitating AlN. However, when the content of Al exceeds 0.1%, there may be a problem that internal defects of the steel sheet due to the excessive formation of Al inclusions occur during steelmaking operation, so the Al content is preferably controlled to 0.1% or less.

Titanium (Ti): 0.005 to 0.03%

Ti is an element that greatly contributes to improving the drawability of the steel sheet by reacting with solid-solution carbon and solid-solution nitrogen to precipitate Ti-based carbonitrides during hot rolling. When the content of Ti is less than 0.005%, carbonitrides may not be sufficiently precipitated, resulting in poor drawability, whereas when the content of Ti exceeds 0.03%, since it is difficult to manage inclusions during steelmaking operations, and thus, inclusion-based defects may occur, the content of Ti is preferably limited to the range of 0.005 to 0.03%.

Niobium (Nb): 0.02 to 0.035%

Nb is the most effective element that may produce very fine grains through the rolling and cooling process as the non-recrystallized region of the austenite region widens at high temperatures due to solute drag and precipitate pinning effects during hot rolling. When the content of Nb is less than 0.02%, the grain size refinement effect is insignificant as the range of the non-recrystallization temperature region of the austenite in steel is narrowed. On the other hand, when the content of Nb exceeds 0.035%, the high-temperature strength increases, causing difficulties in hot rolling, so the content of Nb is preferably limited to the range of 0.02 to 0.035%.

Boron (B): 0.003% or less (excluding 0%)

B is an element added to prevent secondary processing embrittlement due to the addition of P in steel, but when the content of B exceeds 0.003%, the ductility of the steel sheet deteriorates, so the content of B is preferably limited to 0.003% or less.

Copper (Cu): 0.04 to 0.1%

Cu is an element that is difficult to remove when adjusting the steel composition by steelmaking, and is contained in a trace amount (e.g., 0.04% or more), but when the content of Cu exceeds 0.1%, cracks easily occur in the hot-dip galvanized coated steel sheet, which also leads to grain boundary embrittlement or increase cost, the content of Cu is preferable to be limited to the range of 0.04 to 0.1%.

Relationship Formula 1

In the present disclosure, it is required to control the contents of C, Ti, and Nb so that the value defined by the following Relationship Formula 1 satisfies 0.03 to 0.04. The reason why the Relationship Formula 1 is set in the present disclosure is that grain size refinement and uniformity have the greatest effect on distinctness of image after painting by well using the solute drag in the solid solution state and the pinning effect in the precipitated state of Ti and Nb.

When the value defined in the following Relationship Formula 1 is less than 0.03, the grain size is not sufficiently fine, so the amount of surface deformation after the deformation is not constant and excellent distinctness of image after painting may not be obtained, whereas when the value exceeds 0.04, the amount of Nb etc., added relatively increases, which is disadvantageous in terms of cost, and also, as the strength increases more than expected, there is a problem in securing the elongation.

$$0.03 \leq [(Nb(48/93))+(Ti(93/48))+(C(12/48))] \leq 0.04 \quad \text{[Relationship Formula 1]}$$

In addition, a balance of Fe and the inevitable impurities are provided. In addition to the above components, the addition of effective components is not excluded.

Since the present disclosure is a base of a hot-dip galvanized steel sheet made of the ultra-low carbon steel having the content of C of 0.005% or less, the microstructure is composed of a single-phase ferrite structure. However, since the single-phase ferrite structure may include other inevitably formed structures, the alloy microstructure of the present disclosure contains 95% or more of ferrite as an area fraction, and a trace amount of pearlite or the like may remain as the remaining component.

In addition, it is preferable that the average grain size of the crystal grains of the microstructure of the cold-rolled steel sheet, which is the base of the hot-dip galvanized steel sheet of the present disclosure, is 15 μm or less. When the average particle size exceeds 15 μm or less, there is a problem in that it is difficult to secure desired distinctness of image after painting due to uneven surface deformation during forming. More preferably, the average crystal grain size of the base microstructure is controlled to less than 10 μm.

Furthermore, in the base cold-rolled steel sheet of the present disclosure, it is preferable that ultra-fine grains of 5 μm or less have an occupancy ratio of 7 to 10% within an area of 1 mm×1 mm. By having such a ratio, a hot-dip galvanized steel sheet having excellent surface distinctness of image after painting having ΔWsa defined by the following Relationship Formula 2 of 0.1 or less may be obtained. When the ratio is less than 7%, the desired distinctness of image after painting may not be secured because the grain size is relatively large and the surface deformation amount increases after forming (after 5% deformation), and when the ratio exceeds 10%, as the strength is too high, there is a problem in securing an elongation of 32% or more.

$$\Delta Wsa = \text{surface waviness of steel sheet after 5\% deformation} - \text{surface waviness of steel sheet before deformation} \quad \text{[Relationship Formula 2]}$$

Next, a method of manufacturing a high-strength hot-dip galvanized steel sheet having excellent surface distinctness of image after painting according to the present disclosure will be described.

The method of manufacturing a high-strength hot-dip galvanized steel sheet of the present disclosure includes heating a steel slab satisfying the composition components at 1100 to 1300° C.; manufacturing a hot-rolled steel sheet by hot-rolling the heated steel slab to a finish-rolling temperature of 920 to 970° C. and then coiling the hot-rolled steel slab at a temperature of 600 to 650° C.; manufacturing a cold-rolled steel sheet by pickling the coiled hot-rolled steel sheet and cold-rolling the pickled hot-rolled steel sheet at a reduction ratio of 70 to 83%, annealing the cold-rolled steel within a temperature range of 760 to 830° C. and then performing hot-dip galvanizing on the annealed cold-rolled steel, and performing alloying heat treatment on the hot-dip galvanized steel sheet within a temperature range of 500 to 560° C.

First, in the present disclosure, the steel slab having the composition component is heated in a temperature range of 1100 to 1300° C. When the heating temperature is less than 1100° C., a problem may arise in production due to a rolling load of an FM section, and when the heating temperature exceeds 1300° C., a problem may arise in surface scale defects.

Next, in the present disclosure, the hot-rolled steel sheet is manufactured by hot-rolling the heated steel slab to a finish-rolling temperature of 920 to 970° C., and then coiling the heated steel slab at a temperature of 600 to 650° C.

In the present disclosure, it is preferable to limit the finish rolling temperature to 920 to 970° C. When the finish rolling temperature is less than 920° C., coarse grains may be generated on the surface, resulting in uneven material quality, and when the finish rolling temperature exceeds 970° C., the grain size may not be sufficiently fine, resulting in a property shortage problem.

In addition, in the present disclosure, it is preferable to manage the coiling temperature in the range of 600 to 650° C. When the coiling temperature is less than 600° C., precipitates such as Ti (Nb) C are not generated, and as solid-solved Ti and Nb increase, TiC and Ti(Nb)C are finely precipitated during the heating in the annealing process, or the Ti and Nb exist in the solid-solved state and affect recrystallization and growth inhibition, which may cause problems in securing the strength and elongation to be invented, and when the coiling temperature exceeds 630° C., problems with surface heat may occur due to secondary scale generation.

Further, in the present disclosure, the cold-rolled steel sheet is manufactured by cold rolling at a reduction ratio of 70 to 83% after undergoing the pickling process for removing the surface scale of the coiled hot-rolled steel sheet. If the cold rolling reduction ratio is less than 70%, the {111} texture does not grow sufficiently, resulting in poor formability, whereas when the cold rolling reduction ratio exceeds 83%, there is a problem in that the roll load during the on-site manufacturing is very severe, and therefore, the shape is distorted. Therefore, the reduction ratio is preferably limited to 70 to 83%, and more preferably limited to 74 to 80%.

Subsequently, the hot-dip galvanizing or the alloyed hot-dip galvanizing is performed on the cold-rolled steel sheet manufactured as described above via an annealing process thereof.

When the cold-rolled steel sheet is annealed, the annealing needs to be performed at a temperature equal to or higher than the recrystallization temperature within the temperature range of 760 to 830° C. By annealing at a temperature equal to or higher than the recrystallization temperature, the deformation caused by the rolling may be removed, and the workability may be improved by softening.

The annealed cold-rolled steel sheet is hot-dip galvanized as it is in a continuous hot-dip galvanizing line.

In the present disclosure, the alloying heat treatment may be performed on the prepared hot-dip galvanized steel sheet. The alloying heat treatment is performed within the range of 500 to 560° C. after performing the hot-dip galvanizing. When the alloying heat treatment temperature is less than 500° C., the alloying does not sufficiently proceed, whereas when if alloying heat treatment temperature exceeds 560° C., the excessive alloying proceeds and the plating layer becomes embrittled, thereby causing the problems such as peeling of the plating by processing such as pressing.

In this case, in the present disclosure, if necessary, for the hot-dip galvanized steel sheet subjected to the alloying heat treatment, 0.6 to 1.2% skin pass rolling may be performed using a skin pass roll having a roughness Ra of 1.0 to 1.6 μm.

MODE FOR INVENTION

Hereinafter, the present disclosure will be described in more detail with reference to Inventive Examples.

Inventive Example

After reheating a steel slab with a thickness of 250 mm having the alloy composition shown in Table 1 below to 1250° C., hot rolling, cold rolling, continuous annealing, and alloying hot-dip galvanizing were performed under the same conditions as in Table 2, thereby manufacturing a hot-dip galvanized steel sheet.

For each of the manufactured hot-dip galvanized steel sheets, the tensile properties, an r value (Lankford value), a grain size, and a distribution ratio, which are indicators of deep drawing processing, were measured, and ΔWsa was investigated. The measurement method is described below.

As a tensile test, YS, TS, and T-El were measured. Here, YS, TS, and T-El mean yield strength, tensile strength, and elongation at break, respectively, and the tensile test was performed on test pieces obtained in accordance with the JIS 5 standard. As a result of these measurements, the case where the tensile strength was 390 to 430 MPa and the elongation was 32% or more was regarded as a pass.

Meanwhile, for the evaluation of the r value, which is an indicator of the deep drawing processing, JIS5 tensile test pieces were taken in three directions, a parallel direction, a 450 direction, and a perpendicular direction to a rolling direction from the alloyed hot-dip galvanized steel sheet, and the r values of each test piece were measured. For example, the r value was obtained by obtaining a ratio of the change value of the sheet thickness and the change value of the sheet width at the time of performing a tensile strain of about 15% in the above-described tensile test, and the change value of the sheet width relative to the sheet thickness. Then, when the r value parallel to the rolling direction was set to $r_0$, the r value in the 45° direction was set to $r_{45}$, and the r value in the perpendicular direction was set to $r_{90}$, the r values in each direction was calculated by Equation A below. In addition, in this Inventive Example, the case where the r value was 1.2 or greater was regarded as a pass.

$$A = r_0 + 2 * r_{45} + r_{90}/4 \quad \text{[Equation A]}$$

The grain size and its distribution were evaluated using TSL OIM analysis software through EBSD measurement.

In addition, for Wsa evaluation after deformation, cups were manufactured by pressing a blank of 225 mm×225 mm by a press with power of a hollow punch having a diameter of 75 mm and a blank holder in order to completely suppress any material transfer of a substrate between the blank holder and a die. The deformation of the cup is preferably about 17 to 18 mm in a punch pulling depth so that a thickness deformation rate of a bottom is about 5%+/−0.2%. According to Table 3 below, in order to increase the possibility for ΔWsa≤0.1, it can be seen that the grain size of the material needs to be 15 μm or less

TABLE 1

| Steel type | Alloy composition component (wt %) | | | | | | | | | | Relationship |
|---|---|---|---|---|---|---|---|---|---|---|---|
| | C | Si | P | Mo | Mn | Cu | S | Ti | Nb | B | Formula 1 |
| IS1 | 0.004 | 0.025 | 0.048 | 0.05 | 0.48 | 0.08 | 0.0023 | 0.01 | 0.029 | 0.0008 | 0.035 |
| IS2 | 0.0038 | 0.03 | 0.051 | 0.053 | 0.51 | 0.07 | 0.0034 | 0.008 | 0.033 | 0.0004 | 0.033 |
| IS3 | 0.0039 | 0.031 | 0.057 | 0.0576 | 0.48 | 0.08 | 0.0021 | 0.007 | 0.03 | 0.0006 | 0.030 |
| IS4 | 0.0032 | 0.034 | 0.048 | 0.062 | 0.51 | 0.069 | 0.003 | 0.009 | 0.028 | 0.0007 | 0.033 |
| IS5 | 0.0042 | 0.028 | 0.052 | 0.054 | 0.59 | 0.078 | 0.0028 | 0.012 | 0.031 | 0.0006 | 0.040 |
| IS6 | 0.0039 | 0.024 | 0.056 | 0.08 | 0.5 | 0.1 | 0.0015 | 0.01 | 0.034 | 0.0004 | 0.038 |
| CS1 | 0.0078 | 0.03 | 0.078 | 0.06 | 0.8 | 0.13 | 0.0054 | 0.02 | 0.041 | 0.002 | 0.062 |
| CS2 | 0.004 | 0.1 | 0.09 | 0.01 | 0.5 | 0.02 | 0.0022 | 0.05 | 0.021 | 0.001 | 0.109 |
| CS3 | 0.0028 | 0.1 | 0.037 | 0.005 | 0.72 | 0.05 | 0.0028 | 0.02 | 0.02 | 0.008 | 0.050 |
| CS4 | 0.0041 | 0.048 | 0.051 | 0.05 | 0.48 | 0.08 | 0.0023 | 0.015 | 0.042 | 0.0008 | 0.052 |

*In Table 1, Al and N were contained in the range of 0.02% and 0.0005%, respectively, in all steel types, the balance being Fe and inevitable impurities. IS: Inventive Steel, CS: Comparative Steel

TABLE 2

| Steel Type | FDT (° C.) | CT (° C.) | Cold Rolling Reduction Ratio (%) | Annealing Temperature (° C.) | GA Alloying Temperature (° C.) | Remarks |
|---|---|---|---|---|---|---|
| IS1 | 925 | 622 | 77 | 775 | 520 | IE1 |
| | 897 | 600 | 75 | 800 | 535 | CE1 |
| | 935 | 700 | 76 | 830 | 545 | CE2 |

TABLE 2-continued

| Steel Type | FDT (° C.) | CT (° C.) | Cold Rolling Reduction Ratio (%) | Annealing Temperature (° C.) | GA Alloying Temperature (° C.) | Remarks |
|---|---|---|---|---|---|---|
| IS2 | 932 | 620 | 77 | 790 | 525 | IE2 |
|  | 885 | 690 | 80 | 825 | 540 | CE3 |
|  | 930 | 615 | 77 | 753 | 545 | CE4 |
| IS3 | 940 | 618 | 77 | 780 | 525 | IE3 |
| IS4 | 830 | 615 | 81 | 810 | 530 | IE4 |
| IS5 | 920 | 620 | 81 | 769 | 530 | IE5 |
| IS6 | 933 | 622 | 71 | 790 | 520 | IE6 |
| CS1 | 942 | 710 | 72 | 810 | 530 | CE5 |
| CS2 | 923 | 690 | 70 | 720 | 590 | CE6 |
| CS3 | 911 | 618 | 70 | 780 | 600 | CE7 |
| CS4 | 925 | 621 | 77 | 820 | 530 | CE8 |

*IS: Inventive Steel, CS: Comparative Steel, IE: Inventive Example, CE: Comparative Example.

TABLE 3

| Steel Type | YS (MPa) | TS (MPa) | T-El (%) | r value | Average Grain Size (μm) | Fine Grain (≤5 μm) ratio (%) | ΔWsa | Remarks |
|---|---|---|---|---|---|---|---|---|
| IS1 | 275 | 410 | 35 | 1.7 | 7.2 | 7.2 | 0.04 | IE1 |
|  | 266 | 395 | 36 | 1.8 | 14 | 2 | 0.11 | CE1 |
|  | 250 | 389 | 38 | 2 | 19 | 0.6 | 0.15 | CE2 |
| IS2 | 250 | 415 | 35 | 1.6 | 7 | 7 | 0.05 | IE2 |
|  | 235 | 378 | 38 | 2.1 | 17 | 0.3 | 0.15 | CE3 |
|  | 315 | 482 | 22 | 1.1 | 13 | 2.3 | 0.13 | CE4 |
| IS3 | 235 | 412 | 32 | 1.6 | 8 | 8 | 0.03 | IE3 |
| IS4 | 320 | 399 | 34 | 1.5 | 4.5 | 7 | 0.07 | IE4 |
| IS5 | 311 | 405 | 36 | 1.4 | 4 | 7.3 | 0.1 | IE5 |
| IS6 | 270 | 411 | 38 | 1.7 | 8 | 7.5 | 0.09 | IE6 |
| CS1 | 310 | 468 | 29 | 1.1 | 15 | 4 | 0.12 | CE5 |
| CS2 | 380 | 525 | 10 | 0 | 31 | 5 | 0.11 | CE6 |
| CS3 | 225 | 356 | 39 | 1.9 | 23 | 1.5 | 0.12 | CE7 |
| CS4 | 287 | 450 | 28 | 1.6 | 7.5 | 4.5 | 0.11 | CE8 |

*IS: Inventive Steel, CS: Comparative Steel, IE: Inventive Example, CE: Comparative Example.

As shown in Tables 1 to 3, it may be seen that even in not only the steel composition component, but also the manufacturing process conditions of the coated steel sheet, Inventive Examples 1 to 6, which satisfy the scope of the present disclosure, have the excellent tensile properties, the r value, the ultra-fine grain ratio, and ΔWsa.

On the other hand, Comparative Examples 1 to 4 are the case where the steel composition component satisfies the scope of the present disclosure but the coated steel sheet manufacturing process is out of the scope of the present disclosure.

Specifically, in Comparative Example 1 and Comparative Example 3, as the Finish MillDelivery Temperature (FDT) in the hot rolling process was operated below the Ar3 temperature, the grain size of the surface layer increased, so the fine grain ratio was low in the final annealed structure, and the desired ΔWsa was not be secured.

In Comparative Example 2, since processing is performed at the high hot rolling CT temperature of 700° C., the desired fine grain fraction was not secured due to the coarsening of the grain size, and in the Comparative Example 4, since the processing is performed at the annealing temperature below the recrystallization temperature, the desired strength and elongation were not secured without sufficient recrystallization.

In addition, it may be seen that Comparative Examples 5 to 7, in which not only the steel composition components but also the coated steel sheet manufacturing process conditions are out of the scope of the present disclosure, have a large ΔWsa value and poor distinctness of image after painting while the ultra-fine grain ratio is not satisfied.

Meanwhile, Comparative Example 8 is the case where the Relationship Formula 1 in the steel composition component is out of the scope of the present disclosure. Even when the coated steel sheet is manufactured by the coated steel sheet manufacturing process of the present disclosure, the final fine grain fraction is not sufficient, so the desired ΔWsa value was not be secured.

As described above, exemplary embodiments of the present disclosure have been described in the detailed description of the present disclosure, but those of ordinary skill in the art to which the present disclosure pertains may be variously modified without departing from the scope of the present disclosure. Therefore, the scope of the present disclosure is not construed as being limited to the embodiments described above, but should be defined by the following claims as well as equivalents thereto.

The invention claimed is:

1. A high-strength hot-dip galvanized steel sheet having excellent surface distinctness of image after painting, comprising:

by mass %, 0.003 to 0.005% of C, 0.05% or less of Si, 0.4 to 1.0% of Mn, 0.04 to 0.06% of P, 0.01% or less of S, 0.005% or less of N, 0.1% or less of S, Al, 0.05 to 0.08% of Mo, 0.005 to 0.03% of Ti, 0.02 to 0.035% of Nb, 0.06 to 0.1% of Cu, 0.0015% or less of B, and a balance of Fe and inevitable impurities, wherein C, Ti, and Nb satisfy Relationship Formula 1, an alloy microstructure has ferrite in an amount greater than 95% by area fraction or greater, the ferrite has a grain average size of 15 μm or less, and an ultra-fine grain of 5 μm or less has an occupancy ratio to 7 to 10% within a 1 mm×1 mm area, and ΔWsa is 0.1 or less as defined by Relationship Formula 2, $$0.03 \leq [(Nb(48/93))+(Ti(93/48))+(C(12/48))] \leq 0.04 \quad \text{[Relationship Formula 1]}$$

ΔWsa=surface waviness of steel sheet after 5% deformation−surface waviness of steel sheet before deformation. [Relationship Formula 2]

2. The high-strength hot-dip galvanized steel sheet of claim 1, wherein a tensile strength is 390 to 430 MPa, and an elongation is 32% or more.

* * * * *